US012611930B2

(12) United States Patent
Motozaki et al.

(10) Patent No.: US 12,611,930 B2
(45) Date of Patent: Apr. 28, 2026

(54) DISPLAY DEVICE FOR A VEHICLE

(71) Applicant: TOYOTA JIDOSHA KABUSHIKI KAISHA, Toyota (JP)

(72) Inventors: Masaki Motozaki, Toyota (JP); Shinsuke Omori, Toyota (JP); Karl Nicolas Hugo Dujardin, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/676,732

(22) Filed: May 29, 2024

(65) Prior Publication Data

US 2024/0424899 A1     Dec. 26, 2024

(30) Foreign Application Priority Data

Jun. 23, 2023     (JP) ................................. 2023-103745

(51) Int. Cl.
| | |
|---|---|
| *B60K 35/22* | (2024.01) |
| *B60K 35/10* | (2024.01) |
| *B60K 35/53* | (2024.01) |
| *B60K 35/60* | (2024.01) |
| *B60K 35/65* | (2024.01) |
| *B60W 50/14* | (2020.01) |

(52) U.S. Cl.
CPC .............. *B60K 35/22* (2024.01); *B60K 35/10* (2024.01); *B60K 35/53* (2024.01); *B60K 35/60* (2024.01); *B60K 35/658* (2024.01); *B60K 2360/1434* (2024.01); *B60K 2360/1438* (2024.01); *B60K 2360/782* (2024.01); *B60W*

*2050/146* (2013.01); *B60Y 2400/92* (2013.01); *G09G 2380/10* (2013.01)

(58) Field of Classification Search
CPC ........ B60K 35/22; B60K 35/10; B60K 35/53; B60K 2360/1434; B60K 2360/782; B60K 35/60; B60K 2360/1438; B60K 35/658; B60W 2050/146; G09G 2380/10; B60Y 2400/92

See application file for complete search history.

(56) References Cited

U.S. PATENT DOCUMENTS

| | | | | |
|---|---|---|---|---|
| 2012/0127115 | A1* | 5/2012 | Gannon .............. | G06F 3/03547 345/173 |
| 2015/0261364 | A1* | 9/2015 | Cady ..................... | G06F 3/0412 345/173 |
| 2018/0326851 | A1* | 11/2018 | Kim ..................... | B60K 35/215 |

(Continued)

FOREIGN PATENT DOCUMENTS

| | | |
|---|---|---|
| JP | S61-175025 U | 10/1986 |
| JP | 2002-283924 A | 10/2002 |

(Continued)

*Primary Examiner* — Douglas Wilson
(74) *Attorney, Agent, or Firm* — Dinsmore & Shohl LLP

(57)     ABSTRACT

A display device for a vehicle includes: a main body portion disposed between a steering wheel and an instrument panel, the main body portion extending further to both left and right sides than the steering wheel, and a surface of the main body portion that is disposed opposite a driver who is gripping the steering wheel to steer being a display screen; and an operation switch in a long, narrow shape that is provided at an upper edge of the main body portion, a length direction of the operation switch being in a vehicle width direction.

19 Claims, 7 Drawing Sheets

(56) References Cited

U.S. PATENT DOCUMENTS

| | | | |
|---|---|---|---|
| 2020/0015373 A1* | 1/2020 | Caillaud | ............... B60K 37/00 |
| 2020/0247217 A1 | 8/2020 | Doi | |
| 2020/0353971 A1* | 11/2020 | Nakajima | .......... B60H 1/00292 |
| 2021/0107358 A1* | 4/2021 | Shibata | .................... B62D 1/16 |

FOREIGN PATENT DOCUMENTS

| | | |
|---|---|---|
| JP | 2020-124951 A | 8/2020 |
| JP | 2021-062735 A | 4/2021 |

* cited by examiner

DISPLAY DEVICE FOR A VEHICLE

CROSS-REFERENCE TO RELATED APPLICATION

This application is based on and claims priority under 35 USC 119 from Japanese Patent Application No. 2023-103745 filed on Jun. 23, 2023, the disclosure of which is incorporated by reference herein.

BACKGROUND

Technical Field

The present disclosure relates to a display device for a vehicle.

Related Art

Japanese Patent Application Laid-Open (JP-A) No. 2020-124951 discloses a structure in which a side wall portion is provided in a region between a meter section of an instrument panel and a door trim, the structure screening such that a vehicle occupant cannot see a blowing outlet of an air conditioning apparatus. In JP-A No. 2020-124951, a display device is provided at the side wall portion. Meanwhile, JP-A No. 2021-062735 discloses a structure equipped with a central display portion, which is provided to the vehicle front of a steering wheel, and side display portions, which are provided at both left and right sides of the central display portion.

When a display portion is provided nearer than an instrument panel as in the structures recited in JP-A Nos. 2020-124951 and 2020-062735, information is easier to see. However, the display section may be an obstacle to operating operation switches provided at the instrument panel. Providing the control switches at the display section can be considered as a countermeasure, but there is scope for improvement in regard to operability.

SUMMARY

In consideration of the circumstances described above, the present disclosure provides a display device for a vehicle that may achieve both visibility of information and operability.

A display device for a vehicle according to a first aspect includes: a main body portion disposed between a steering wheel and an instrument panel, the main body portion extending further to both left and right sides than the steering wheel, and a surface of the main body portion that is disposed opposite a driver who is gripping the steering wheel to steer being a display screen; and an operation switch in a long, narrow shape that is provided at an upper edge of the main body portion, a length direction of the operation switch being in a vehicle width direction.

In the display device for a vehicle according to the first aspect, the main body portion is disposed between the steering wheel and the instrument panel, and the main body portion extends further to both the left and right sides than the steering wheel. Therefore, display contents displayed at this display screen may be seen by a vehicle occupant greatly moving their eyeline less than with a structure in which the information is displayed at the instrument panel. Because the main body portion extends to both left and right sides relative to the steering wheel, hands gripping the steering wheel are not an obstacle when the vehicle occupant looks at the display screen.

The operation switch is provided at the upper edge of the main body portion, and this operation switch is formed in a long, narrow shape whose length direction is in the vehicle width direction. Therefore, the operation switch is easy to operate even in a state in which the vehicle occupant's eyeline is directed forward.

In a display device for a vehicle according to a second aspect, in the first aspect, the main body portion includes: a right side display portion in a plate shape that is disposed to a vehicle front of a right side region of the steering wheel and, in plan view, is angled toward a vehicle rear side on progression toward the vehicle right side, and a left side display portion in a plate shape that is disposed to the vehicle front of a left side region of the steering wheel and, in plan view, is angled toward the vehicle rear side on progression toward the vehicle left side; and the operation switch is provided respectively at an upper edge of the right side display portion and an upper edge of the left side display portion.

In the display device for a vehicle according to the second aspect, information may be displayed at each of the right side display portion and the left side display portion. Because the right side display portion and left side display portion are in plate shapes, the display portions may be arranged in minimal space. Because the operation switches are provided at the respective upper edges of the right side display portion and the left side display portion, respectively different functions may be assigned to the display switches.

In a display device for a vehicle according to a third aspect, in the second aspect, the display screen at each of the right side display portion and the left side display portion is provided with a touch panel that a vehicle occupant may operate by touching.

In the display device for a vehicle according to the third aspect, a driver may conduct operations without greatly moving a hand from the steering wheel.

In a display device for a vehicle according to a fourth aspect, in the third aspect, the touch panels are provided only in regions that extend at the left and right sides relative to the steering wheel.

In the display device for a vehicle according to the fourth aspect, the touch panel at the right side display portion is provided only in the region extending at the right side beyond the steering wheel. Therefore, in a state in which the vehicle occupant is gripping the steering wheel, misoperation due to touching another region of the right side display portion may be suppressed. Similarly, the touch panel at the left side display portion is provided only in the region extending at the left side beyond the steering wheel. Therefore, in a state in which the vehicle occupant is gripping the steering wheel, misoperation due to touching another region of the left side display portion may be suppressed.

In a display device for a vehicle according to a fifth aspect, in the third aspect, the touch panels are provided at the whole of the display screens, operation items with relatively high frequencies of operation are displayed at a region of the right side display portion that is at the right side relative to the steering wheel and a region of the left side display portion that is at the left side relative to the steering wheel, and operation items with relatively low frequencies of operation are displayed at a region of the right side display portion that is at the left side relative to the steering wheel and a region of the left side display portion that is at the right side relative to the steering wheel.

In the display device for a vehicle according to the fifth aspect, operation items with higher operation frequencies are displayed in a region at the right side of the right side display portion relative to the steering wheel and a region at the left side of the left side display portion relative to the steering wheel. Therefore, a driver may easily touch these operation items. Operation items with relatively low operation frequencies are kept displayed in other regions of the display screen. Therefore, convenience for the vehicle occupant may be improved relative to a structure in which these operation items are not displayed.

In a display device for a vehicle according to a sixth aspect, in the third aspect, a finger rest portion is provided at a face of each of the right side display portion and the left side display portion that is at the opposite side thereof from the side at which the display screen is provided.

In the display device for a vehicle according to the sixth aspect, in a state in which the driver grips the right side display portion or left side display portion in order to operate the touch panel, the driver may rest a finger on the finger rest portion. Therefore, the driver may conduct operations precisely even while driving.

In a display device for a vehicle according to a seventh aspect, in the first aspect, a vehicle width direction central portion of a lower end portion of the main body portion is disposed further upward than both of vehicle width direction end portions of the lower end portion.

In the display device for a vehicle according to the seventh aspect, contact of a knee area of the vehicle occupant against a lower end portion of the main body portion may be suppressed. Furthermore, because both the vehicle width direction end portions of the main body portion are disposed further downward than the vehicle width direction central portion, the vehicle occupant may conduct operations with ease.

In a display device for a vehicle according to an eighth aspect, in the seventh aspect, the vehicle width direction central portion of the lower end portion of the main body portion is disposed further upward than a lower end of the steering wheel as seen from the vehicle rear side.

In the display device for a vehicle according to the eighth aspect, because the vehicle width direction central portion of the lower end portion of the main body portion is disposed further upward than the lower end of the steering wheel, contact with the knee area of the vehicle occupant may be suppressed effectively.

In a display device for a vehicle according to a ninth aspect, in the second aspect, a region between the right side display portion and the left side display portion is recessed toward a vehicle front side relative to the right side display portion and the left side display portion.

In the display device for a vehicle according to the ninth aspect, contact of a hand of the vehicle occupant gripping the steering wheel with the main body portion may be suppressed. Furthermore, rigidity of the main body portion may be improved by steps being formed between the right side display portion and left side display portion and the recessed region.

In a display device for a vehicle according to a tenth aspect, in the second aspect, a region of the main body portion between the right side display portion and the left side display portion is cut out.

In the display device for a vehicle according to the tenth aspect, contact of a hand of the vehicle occupant gripping the steering wheel with the main body portion may be suppressed. Furthermore, the main body portion may be reduced in weight.

In a display device for a vehicle according to an eleventh aspect, in any one of the first to tenth aspects, the main body portion is structured to enable adjustment of a position thereof in a vertical direction independently of the steering wheel.

In the display device for a vehicle according to the eleventh aspect, a relative position of the main body portion with respect to the steering wheel may be adjusted in accordance with the physical build of a driver, posture and the like.

As described above, according to the display device for a vehicle and seat for a vehicle according to the present disclosure, visibility of information and operability may both be achieved.

BRIEF DESCRIPTION OF THE DRAWINGS

Exemplary embodiments of the present disclosure will be described in detail based on the following figures, wherein.

DETAILED DESCRIPTION

Figure 1:
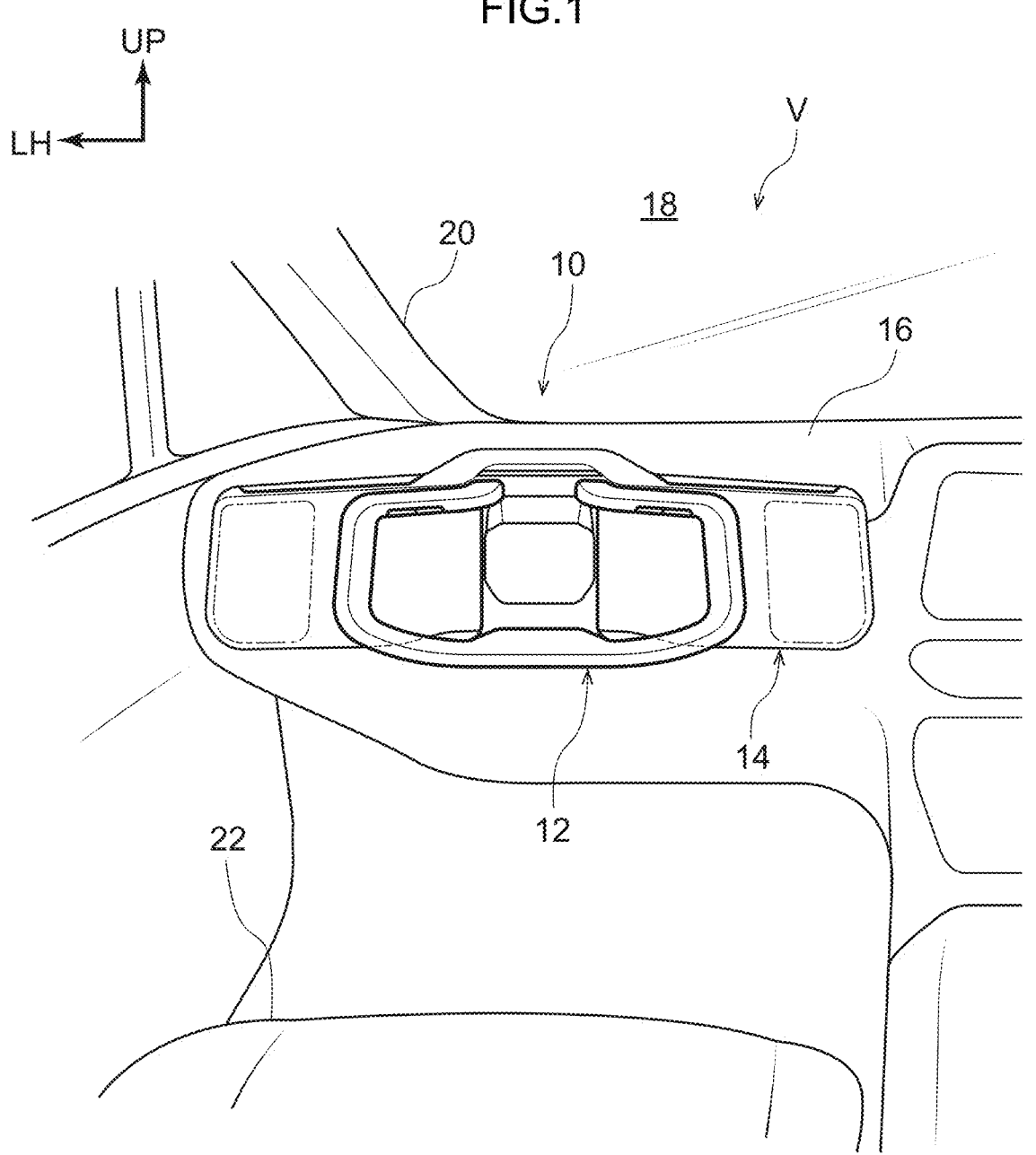
FIG. 1 is a schematic view in which a driver seat vicinity of a vehicle in which a steering module according to an exemplary embodiment is employed is seen from the vehicle rear side.

A vehicle V in which a steering module 10 according to an exemplary embodiment is employed is described with reference to the drawings. The arrow FR, arrow UP and arrow LH in the drawings indicate, respectively, a vehicle front side, vehicle upper side and vehicle left side. Below, where descriptions are given using directions to front and rear, left and right, and upper and lower, unless particularly specified these refer to front and rear in the vehicle front-and-rear direction, left and right in the vehicle width direction, and upper and lower in the vehicle vertical direction.

As shown in FIG. 1, an instrument panel 16 is provided at a front portion of a cabin interior of the vehicle V. The instrument panel 16 extends in the vehicle width direction, and a steering wheel 12 is provided at the vehicle left side of the instrument panel 16. That is, the present exemplary embodiment is an example of a left-hand drive car in which the steering wheel 12 is provided at the left side and a driver seat is set at the vehicle left side, but this is not limiting. For example, the exemplary embodiment may be applied to a right-hand drive car in which the steering wheel 12 is provided at the vehicle right side.

A windshield glass 18 is provided at a front end portion of the instrument panel 16. The windshield glass 18 extends in the vehicle vertical direction and the vehicle width direction, dividing the cabin interior from the cabin exterior.

A vehicle left side end portion of the windshield glass 18 is fixed to a front pillar 20 at the vehicle left side. The front pillar 20 extends in the vehicle vertical direction, and the windshield glass 18 is fixed to a vehicle width direction inner side end portion of the front pillar 20.

A vehicle seat 22 is disposed at the vehicle rear side relative to the instrument panel 16. The vehicle seat 22 is a driver seat on which a vehicle occupant sits. The vehicle V according to the present exemplary embodiment is a vehicle that is equipped with an autonomous driving mode that runs without the vehicle occupant performing driving operations. The vehicle V is configured so as to allow running in the autonomous driving mode when predetermined conditions are satisfied in a manual driving mode. The steering module 10 is provided to the front of the vehicle seat 22.

Steering Module 10

Figure 2:
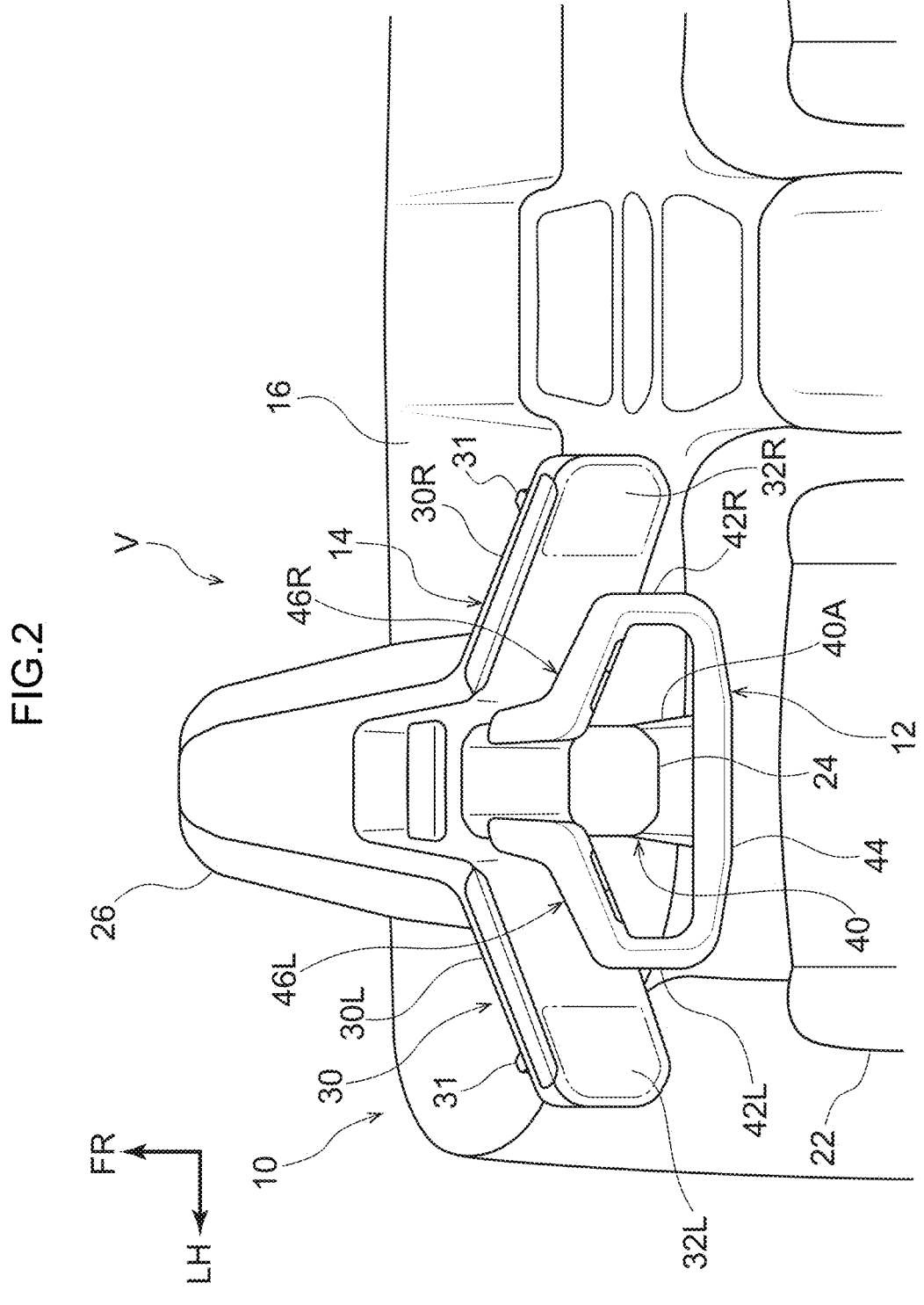
FIG. 2 is a schematic view in which the driver seat vicinity of FIG. 1 is seen diagonally from the upper rear.

FIG. 2 is a schematic view in which the driver seat vicinity is seen diagonally from the upper rear. As shown in FIG. 2, the steering module 10 includes the steering wheel 12 and a display device for a vehicle 14 (display device 14). The vehicle occupant grips the steering wheel 12 and steers.

The steering module 10 is provided with a module base 26 that is attached to the instrument panel 16. The module base 26 is formed in a shape that narrows in plan view from the vehicle rear side toward the vehicle front side. A front end portion of the module base 26 is fixed to an upper face of the instrument panel 16.

A column portion 24 that structures the steering wheel 12 is provided at the vehicle width direction middle of a rear end portion of the module base 26. The display device 14 is provided at both of vehicle width direction end portions of the rear end portion of the module base 26. The display device 14 is disposed between the steering wheel 12 and the instrument panel 16, and displays information to the vehicle occupant.

Display Device for a Vehicle 14

Figure 3:
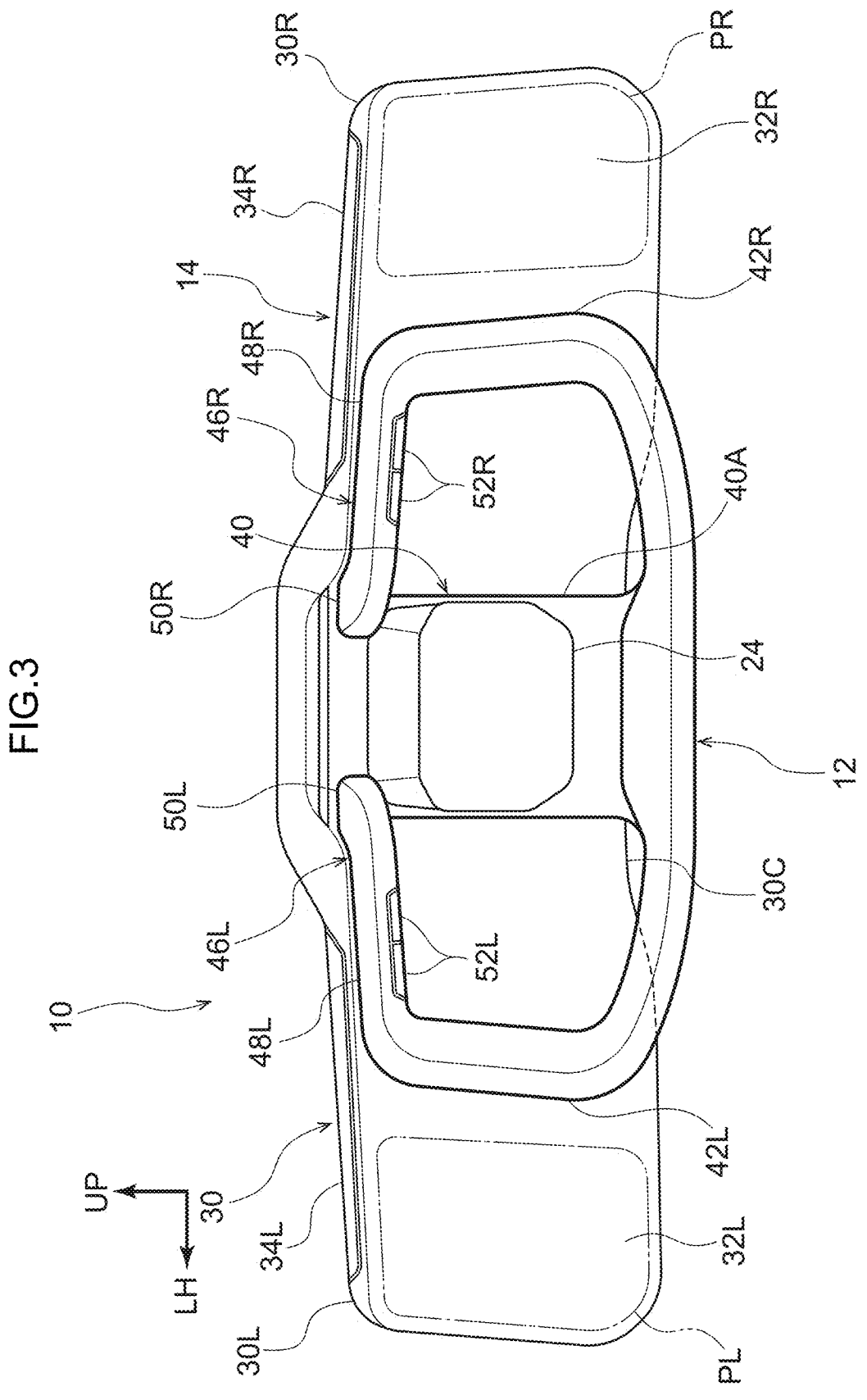
FIG. 3 is a magnified view in which the steering module of FIG. 1 is magnified and seen from the vehicle rear side.

FIG. 3 is a magnified view in which the steering module 10 is magnified and seen from the vehicle rear side. As shown in FIG. 3, the display device 14 is provided with a main body portion 30. The main body portion 30 extends further to both left and right sides (both sides in the vehicle width direction) than the steering wheel 12, and is configured such that information is displayed on screens facing the vehicle seat 22.

More specifically, the main body portion 30 is provided with a center portion 30C, a right side display portion 30R and a left side display portion 30L. The center portion 30C is disposed at a vehicle width direction middle portion of the steering module 10, the right side display portion 30R is disposed at the vehicle right side relative to the vehicle width direction middle of the steering module 10, and the left side display portion 30L is disposed at the vehicle left side relative to the vehicle width direction middle of the steering module 10.

The right side display portion 30R is formed in a substantially rectangular plate shape. The right side display portion 30R is disposed to the vehicle front of a right side portion of the steering wheel 12 and, in plan view, is angled to the vehicle rear side in a direction toward the vehicle right side. The left side display portion 30L is formed in a shape with left-and-right symmetry with the right side display portion 30R. That is, the left side display portion 30L is formed in a substantially rectangular plate shape, is disposed to the vehicle front of a left side portion of the steering wheel 12 and, in plan view, is angled to the vehicle rear side in a direction toward the vehicle left side.

A surface at the vehicle rear side of the right side display portion 30R that opposes the driver seat is an electronic right display screen 32R, and a surface at the vehicle rear side of the left side display portion 30L that opposes the driver seat is an electronic left display screen 32L. In the descriptions below, where the right display screen 32R and left display screen 32L are not being distinguished, they are referred to simply as the display screens 32.

Each of the display screens 32 is equipped with a touch panel that the vehicle occupant may operate by touching. Accordingly, the display device 14 is configured such that the vehicle occupant may touch images and the like displayed at the display screen 32 and select functions corresponding with the images.

In the present exemplary embodiment, as an example, touch panels are provided at the whole of the display screens 32. That is, a touch panel is formed such that information is displayed at the whole of the surface of the vehicle rear side of the right side display portion 30R, and images displayed at the right side display portion 30R may be operated as appropriate. Similarly to the right side display portion 30R, a touch panel is formed such that information is displayed at the whole of the surface of the vehicle rear side of the left side display portion 30L, and images displayed at the left side display portion 30L may be operated as appropriate.

In particular, operation items with relatively high frequencies of operation are displayed in a region PR at the right side of the right side display portion 30R relative to the steering wheel and a region PL at the left side of the left side display portion 30L relative to the steering wheel 12.

For example, information concerning operations relating to an air conditioning apparatus, music playback and entertainment is displayed in the region PR, and the vehicle occupant may hold the right side display portion 30R and select images displayed in the region PR with a finger of the right hand. Meanwhile, information relating to driving support functions such as active cruise control, switching between driving modes and so forth is displayed in the region PL, and the vehicle occupant may hold the left side display portion 30L and select images displayed in the region PL with a finger of the left hand.

A region of the right side display portion 30R at the left side relative to the steering wheel 12 and a region of the left side display portion 30L at the right side relative to the steering wheel 12 are regions that are more difficult for the vehicle occupant to operate. Accordingly, operation items with relatively low frequencies of operation are displayed in these regions. For example, settings of a navigation system that are conducted while the vehicle V is parked and the like may be displayed in these regions. Operation items that do not need to be operated may be displayed in these regions as operation items with relatively low frequencies of operation. For example, items that the vehicle occupant does not need to operate, such as warning displays, social networking service (SNS) messages and the like may be displayed in these regions, and items that are not operated during driving but operated while the vehicle is stopped may be displayed in these regions.

In the present exemplary embodiment, the touch panels are provided at the whole surfaces of the display screens 32, but this is not limiting. Structures are possible in which touch panels are provided only at the region PR and the region PL, in which case a touch panel need not react when the hand of a vehicle occupant operating the steering wheel 12 touches the display screen 32. More specifically, consequent to a touch panel being provided only at a region of the right side display portion 30R extending at the right side beyond the steering wheel 12, misoperation due to a hand touching another portion of the right side display portion 30R in a state in which the hand is gripping the steering wheel 12 may be suppressed. Similarly, consequent to a touch panel being provided only at a region of the left side display portion 30L extending at the left side beyond the steering wheel 12, misoperation due to a hand touching another portion of the left side display portion 30L in a state in which the hand is gripping the steering wheel 12 may be suppressed.

As shown in FIG. 2, finger rest portions 31 are provided at surfaces at the opposite sides of the right side display portion 30R and left side display portion 30L from the sides thereof at which the display screens 32 are disposed. In the present exemplary embodiment, as an example of each finger rest portion 31, a protrusion portion for resting a finger is formed. When a finger is hooked on this protrusion portion, operability of the display screen 32 is improved. Alternatively, a recess portion that is recessed relative to the main surface for resting a finger may be provided as the finger rest portion.

A right operation switch 34R and a left operation switch 34L are provided at an upper edge of the main body portion 30. The right operation switch 34R is provided at the upper edge of the right side display portion 30R and is formed in a long, narrow shape whose length direction is in the vehicle width direction. In some embodiments, functions that may be operated regardless of information displayed at the display device 14 are assigned to the right operation switch 34R and left operation switch 34L. As an example in the present exemplary embodiment, a hazard lamp function is assigned to the right operation switch 34R and a high beam function is assigned to the left operation switch 34L, but this is not limiting.

A lower end portion of the center portion 30C of the main body portion 30 is disposed further upward than a lower end portion of the right side display portion 30R and a lower end portion of the left side display portion 30L. More specifically, the center portion 30C is disposed to the vehicle front relative to the right side display portion 30R and the left side display portion 30L, and the lower end portion of the center portion 30C is disposed further upward than the lower end of the steering wheel 12 as viewed from the vehicle rear side. A lower edge of the right side display portion 30R, a lower edge of the center portion 30C, and a lower edge of the left side display portion 30L are joined so as to be connected by a smoothly curved surface.

Steering Wheel 12

The steering wheel 12 includes the column portion 24, a base portion 40, a right grip portion 42R, a left grip portion 42L, a connecting portion 44, an upper right perimeter portion 46R and an upper left perimeter portion 46L.

As shown in FIG. 2, the column portion 24 projects from the instrument panel 16 through the module base 26 toward the vehicle rear. Sensors, which are capable of detecting a vehicle occupant and are not shown in the drawings, are provided at a distal end portion of the column portion 24. The sensors include a sensor that detects the whole face of a vehicle occupant, a sensor that detects the eyes, a sensor that detects an eyeline direction and a sensor that detects posture, or the like.

Air blowing holes, which are capable of blowing air toward the vehicle rear and are not shown in the drawings, are also provided at the distal end portion of the column portion 24. For example, the air conditioning apparatus is provided at the vehicle front side relative to the instrument panel 16 and is structured such that air whose temperature is controlled by the air conditioning apparatus is blown through the interior of the column portion 24 and from the air blowing holes toward the driver seat. Thus, because the air blowing holes are provided in the distal end portion of the column portion 24, there is no need to dispose a register at the instrument panel 16, and flexibility of design of the vehicle interior is improved. In addition, air may be blown from closer to the vehicle occupant than in a structure in which air is blown from the instrument panel 16.

As an example in the present exemplary embodiment, the column portion 24 is structured to be tiltable in the vertical direction relative to the module base 26. That is, the main body portion 30 is structured to be adjustable in position in the vertical direction independently from the steering wheel 12.

As shown in FIG. 3, the base portion 40 is provided at the column portion 24. The base portion 40 extends in the vehicle vertical direction and the vehicle width direction. The base portion 40 is turnably attached to a portion of the column portion 24 between a base end portion and the distal end portion.

The right grip portion 42R, which may be gripped by the vehicle occupant, is disposed at the right side relative to the base portion 40. The left grip portion 42L, which may be gripped by the vehicle occupant, is disposed at the left side relative to the base portion 40. The right grip portion 42R and left grip portion 42L both extend in the vehicle vertical direction and are formed in shapes with left-and-right symmetry about the center of the steering wheel 12.

A lower end portion of the base portion 40, a lower end portion of the right grip portion 42R and a lower end portion of the left grip portion 42L are connected in the vehicle width direction by the connecting portion 44. The connecting portion 44 is a long, narrow member that is disposed at the lower side relative to the column portion 24 and whose length direction is in the vehicle width direction. A vehicle width direction central portion of the connecting portion 44 is formed to be wider in the vehicle front-and-rear direction than both of vehicle width direction end portions.

An attachment piece 40A extends to the vehicle front side from a lower end portion of the base portion 40. The vehicle width direction central portion of the connecting portion 44 is fixed to the attachment piece 40A. A car horn switch may be provided at the vehicle width direction central portion of the connecting portion 44.

Both the vehicle width direction end portions of the connecting portion 44 are gently curved so as to gradually rise towards the two vehicle width direction sides, and are formed integrally with the right grip portion 42R and the left grip portion 42L.

The upper right perimeter portion 46R is provided at an upper end portion of the right grip portion 42R. The upper right perimeter portion 46R includes an upper right steering portion 48R and a right sightline guide portion 50R. The upper right steering portion 48R extends diagonally to the front-left side from the upper end portion of the right grip portion 42R. The right sightline guide portion 50R extends further to the vehicle front from an end portion of the upper right steering portion 48R and is connected with an upper end portion of the base portion 40.

The upper left perimeter portion 46L is provided at an upper end portion of the left grip portion 42L. The upper left perimeter portion 46L includes an upper left steering portion 48L and a left sightline guide portion 50L. The upper left steering portion 48L extends diagonally to the front-left side from the upper end portion of the left grip portion 42L. The left sightline guide portion 50L extends further to the vehicle front from an end portion of the upper left steering portion 48L and is connected with the upper end portion of the base portion 40.

A gap is provided between the upper right perimeter portion 46R and the upper left perimeter portion 46L. A base end region of the module base 26 may be viewed through this gap. Accordingly, a display portion such as a display screen or the like may be provided in a region of the module base 26 between the upper right perimeter portion 46R and upper left perimeter portion 46L.

Steering wheel switches are provided at one or both of the upper right perimeter portion 46R and the upper left perimeter portion 46L. As an example in the present exemplary embodiment, two right steering wheel switches 52R are provided at the upper right perimeter portion 46R. The two right steering wheel switches 52R are provided side by side in a face at the vehicle rear side of the upper right steering portion 48R. Respectively different functions are assigned to the two right steering wheel switches 52R. For example, functions such as a right indicator, switching between low beam and high beam, launching a voice entry device, and the like may be assigned to the right steering wheel switches 52R.

Meanwhile, two left steering wheel switches 52L are provided at the upper left perimeter portion 46L. The two left steering wheel switches 52L are provided side by side in a face at the vehicle rear side of the upper left steering portion 48L. Respectively different functions are assigned to the two left steering wheel switches 52L. For example, functions such as a left indicator, starting a windshield wiper, launching active cruise control, and the like may be assigned to the left steering wheel switches 52L.

The steering module 10 according to the present exemplary embodiment is structured as described above. The display device 14 and the steering wheel 12 are disposed to be spaced apart in the vehicle front-and-rear direction.

Figure 4:
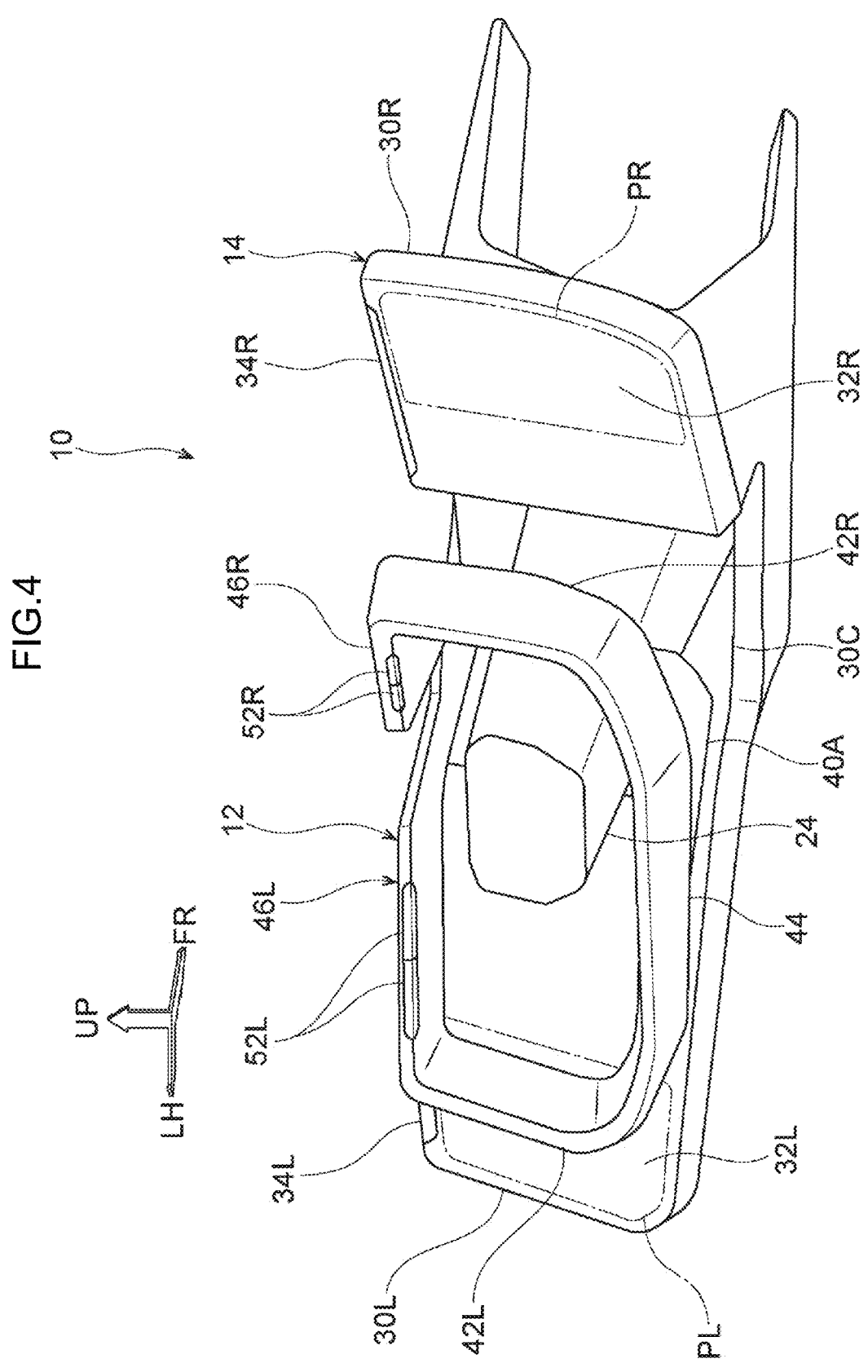
FIG. 4 is a magnified view in which the steering module of FIG. 1 is magnified and seen diagonally from the upper rear side.

FIG. 4 is a magnified view in which the steering module 10 of FIG. 1 is magnified and seen diagonally from the rear right side. As shown in FIG. 4, a gap is provided between the right grip portion 42R of the steering wheel 12 and the right side display portion 30R of the display device 14. The gap is large enough that, in a state in which a vehicle occupant is gripping the right grip portion 42R, the hand of the vehicle occupant will not touch the right side display portion 30R.

In some embodiments, the gap between the right grip portion 42R and the right side display portion 30R is at least 5 cm and at most 30 cm, or at least 7 cm and at most 20 cm. A gap is also provided between the left grip portion 42L of the steering wheel 12 and the left side display portion 30L of the display device 14, of a similar size to the gap at the right side.

In the steering module 10 according to the present exemplary embodiment, the steering wheel 12 is structured to be stowable. For example, after the driving mode of the vehicle V is switched to the autonomous driving mode, if switching to the manual driving mode is not anticipated for a long time, the steering wheel 12 is stowed.

Figure 5:
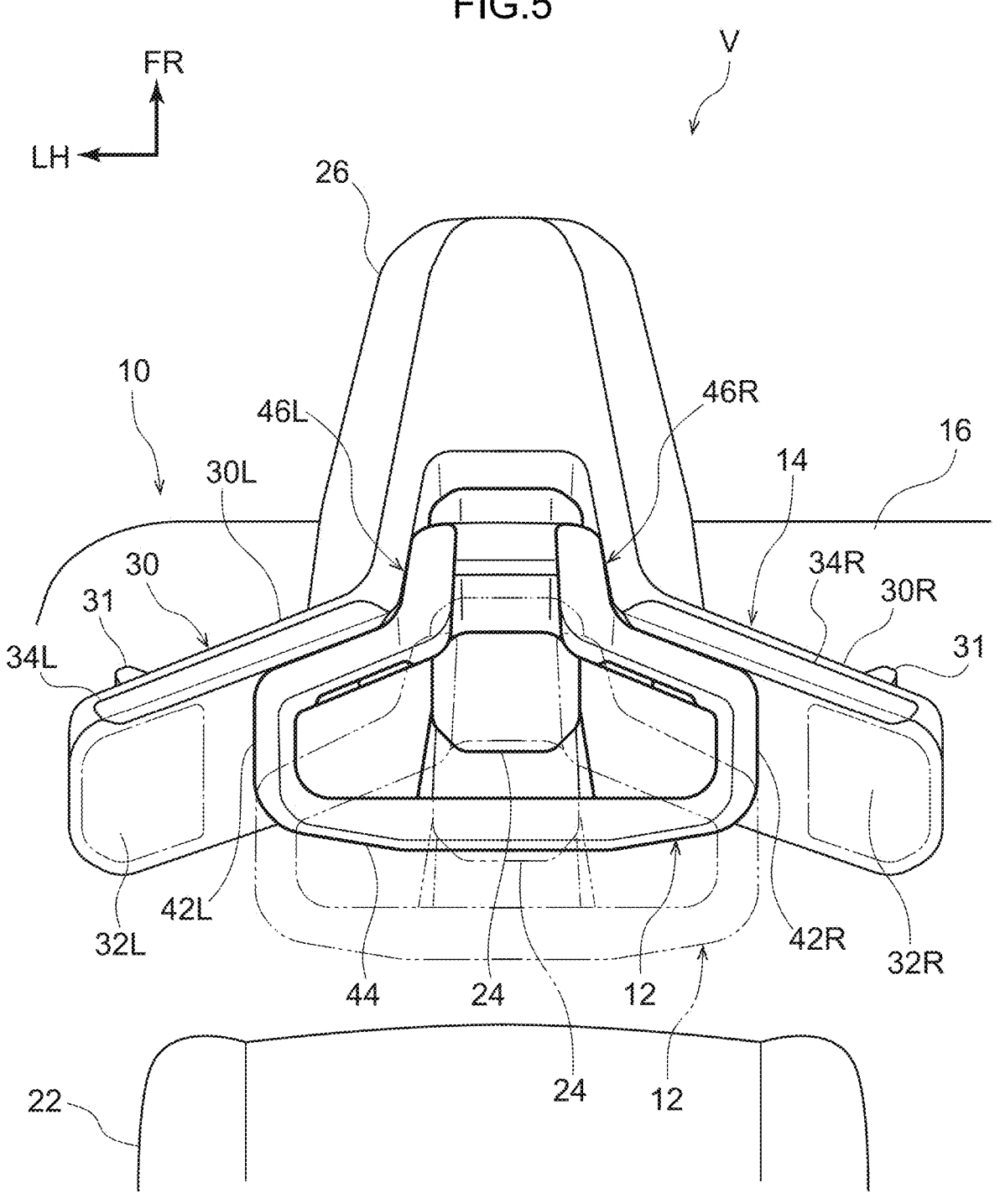
FIG. 5 is a view showing a state in which a steering wheel is moved to a stowed position from the state in FIG. 2.

FIG. 5 is a view showing a state in which the steering wheel 12 is moved to a stowed position from the state in FIG. 2. In FIG. 5, a state in which the steering wheel 12 is at a usage position is depicted by two-dot chain lines and a state in which the steering wheel 12 is at the stowed position is depicted by solid lines.

As shown in FIG. 5, the steering wheel 12 is structured to be relatively movable in the vehicle front-and-rear direction with respect to the display device 14. For example, the steering wheel 12 is a structure that is locked in a state in which the column portion 24 of the display device 14 is inserted into the module base 26, and when this locked state is released, the column portion 24 is switched to a state that is relatively movable with respect to the module base 26.

As shown by the two-dot chain lines in FIG. 5, when the base portion 40 and column portion 24 are at the usage position, the vehicle occupant may steer and the display device 14 is spaced apart in the vehicle front-and-rear direction from the right grip portion 42R and left grip portion 42L of the steering wheel 12. In contrast, as shown by the solid lines, at the stowed position to which the steering wheel 12 is moved in the vehicle front-and-rear direction, the right grip portion 42R and the left grip portion 42L touch against the display device 14.

More specifically, in the present exemplary embodiment in plan view, an angle of the right side display portion 30R and an angle of the upper right steering portion 48R are substantially the same, and an angle of the left side display portion 30L and an angle of the upper left steering portion 48L are substantially the same. Therefore, at the stowed position, the right grip portion 42R and upper right steering portion 48R of the steering wheel 12 are in contact with the right side display portion 30R and right display screen 32R, and the left grip portion 42L and upper left steering portion 48L are in contact with the left side display portion 30L and left display screen 32L.

In the steering module 10 according to the present exemplary embodiment, a light source is provided in the interior of at least one of the right grip portion 42R, the left grip portion 42L, the connecting portion 44, the upper right perimeter portion 46R and the upper left perimeter portion 46L. The steering module 10 is configured such that the light source emits light when a vehicle occupant should grip the right grip portion 42R and left grip portion 42L.

In particular in the present exemplary embodiment, the material feel of a cover of the steering wheel 12 is the material feel of an ordinary synthetic leather, but the cover is formed of a material that enables the interior to be seen. When the light source emits light, the light is transmitted through the cover and is visible as if the surface of the cover is lighting up.

Operation

Now, operation of the steering module 10 according to the present exemplary embodiment is described.

As shown in FIG. 2, in the steering module 10 according to the present exemplary embodiment, the main body portion 30 of the display device 14 is disposed between the steering wheel 12 and the instrument panel 16, and the main body portion 30 extends further to both the left and right sides than the steering wheel 12. Therefore, display contents displayed at the display screen 32 may be seen by a vehicle occupant greatly moving their eyeline less than with a structure in which a display portion is provided at the instrument panel 16. Because the main body portion 30 extends to both the left and right sides relative to the steering wheel 12, hands gripping the steering wheel are not an obstacle when the vehicle occupant looks at the display screen 32.

In the display device 14 according to the present exemplary embodiment, the right operation switch 34R and left operation switch 34L are provided at the upper edge of the main body portion 30. These operation switches are formed in long, narrow shapes whose length directions are in the vehicle width direction. Therefore, the operation switches are easy to operate even in a state in which the eyeline of the vehicle occupant is directed forward.

In the display device 14 according to the present exemplary embodiment, because the right side display portion 30R and left side display portion 30L are in plate shapes, the display portions may be arranged in minimal space. In addition, because the right operation switch 34R is provided at the upper edge of the right side display portion 30R and the left operation switch 34L is provided at the upper edge of the left side display portion 30L, respectively different functions may be assigned thereto.

In the display device 14 according to the present exemplary embodiment, because a touch panel is provided at the display screen 32, the vehicle occupant may conduct operations without greatly moving their hand from the steering wheel 12.

In the display device 14 according to the present exemplary embodiment, operation items with high frequencies of operation are displayed in the region at the right side of the right side display portion 30R relative to the steering wheel 12 and the region at the left side of the left side display portion 30L relative to the steering wheel 12. Therefore, the vehicle occupant may easily touch these operation items. Operation items with relatively low frequencies of operation are kept displayed in other regions of the display screen. Therefore, convenience for the vehicle occupant may be improved relative to a structure in which these operation items are not displayed.

In the display device 14 according to the present exemplary embodiment, in a state in which the vehicle occupant grips the right side display portion or left side display portion in order to operate a touch panel, the vehicle occupant may rest a finger on a finger rest portion. Therefore, the vehicle occupant may conduct operations precisely even while driving.

In the display device 14 according to the present exemplary embodiment, because the vehicle width direction central portion of the lower edge portion of the main body portion 30 is disposed further upward than the lower end of the steering wheel 12, contact of the knee area of the vehicle occupant with the lower end portion of the main body portion 30 may be suppressed. Furthermore, because both the vehicle width direction end portions of the main body portion 30 are disposed further upward than the vehicle width direction central portion, the vehicle occupant may conduct operations without greatly moving their hands and may conduct operations easily.

In the display device 14 according to the present exemplary embodiment, because the column portion 24 is structured to be tiltable in the vertical direction relative to the module base 26, the relative position of the main body portion 30 with respect to the steering wheel 12 may be adjusted in accordance with the physical build of the vehicle occupant, posture and the like.

As shown in FIG. 3, in the steering wheel 12 according to the present exemplary embodiment, the lower end portions of the right grip portion 42R and the left grip portion 42L are connected to the lower end portion of the base portion 40 by the connecting portion 44, and the upper right perimeter portion 46R and upper left perimeter portion 46L are connected to the upper end portion of the base portion 40. Thus, because the upper portion and lower portion of the steering wheel 12 are respectively connected to the base portion 40, the steering wheel 12 is more resistant to deformation than a cantilever structure in which only one of the upper portion and lower portion of the steering wheel 12 is fixed to a steering column or the like.

In the steering wheel 12 according to the present exemplary embodiment, because the right steering wheel switches 52R are provided at the upper right perimeter portion 46R and the left steering wheel switches 52L are provided at the upper left perimeter portion 46L, the vehicle occupant may operate the steering wheel switches in the state in which the steering occupant is gripping the steering wheel 12.

In the steering wheel 12 according to the present exemplary embodiment, because the base portion 40 is turnably attached to the column portion 24, the steering wheel 12 may steer without the column portion 24 being turned. In particular, because the sensors capable of detecting the vehicle occupant are provided at the distal end portion of the column portion 24 in the present exemplary embodiment, the sensors are not turned even in states in which the steering wheel 12 is operated and detection accuracy of the sensors may be maintained.

In the steering wheel 12 according to the present exemplary embodiment, because the air blowing holes are provided at the distal end portion of the column portion 24, air may be blown from a position closer to the vehicle occupant than in a structure that blows air toward a vehicle occupant from air blowing holes provided at the instrument panel 16.

In the steering wheel 12 according to the present exemplary embodiment, as shown in FIG. 5, because the steering wheel 12 is structured so as to enable movement to the stowed position of the vehicle front side, the base portion 40 and column portion 24 may be moved to the stowed position and more space may be obtained in the vicinity of the driving seat than when steering by the vehicle occupant is necessary, such as during manual driving and the like.

Hereabove, the steering module 10 according to the present exemplary embodiment is described. It will be clear that numerous embodiments are possible within a scope not departing from the gist of the present disclosure. In the present exemplary embodiment, as shown in FIG. 3, the display screens 32 are provided as far as regions at the inner side of the steering wheel 12 as viewed from the vehicle rear side, but this is not limiting. For example, the structures of a first variant example shown in FIG. 6 and a second variant example shown in FIG. 7 may be employed.

First Variant Example

Figure 6:
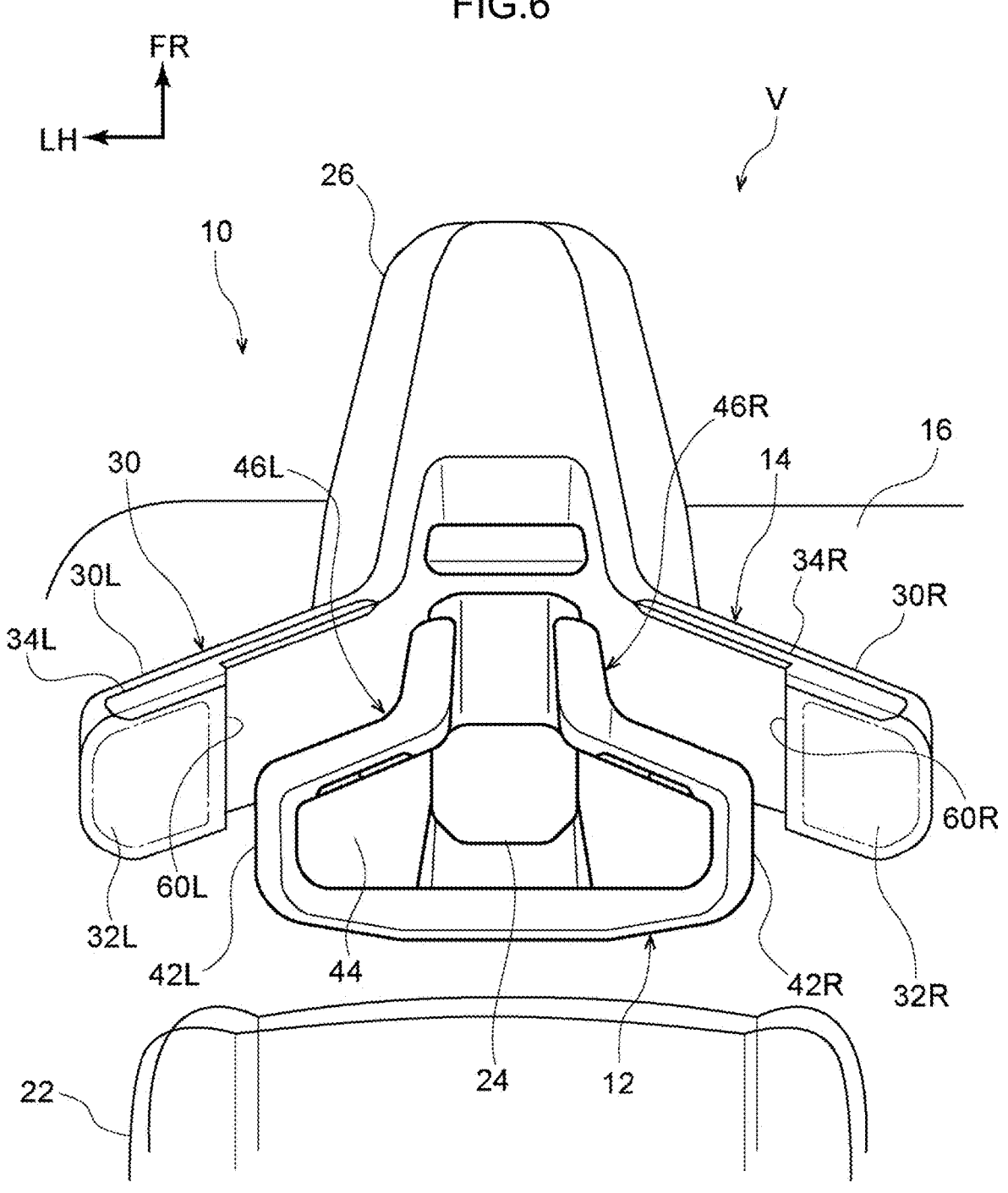
FIG. 6 is a view in which a steering module according to a first variant example is seen from the vehicle rear side.

FIG. 6 is a view in which the steering module 10 according to the first variant example is seen from the vehicle rear side. As shown in FIG. 6, in the present variant example, a region between the right side display portion 30R and the left side display portion 30L is recessed to the vehicle front side relative to the right side display portion 30R and the left side display portion 30L.

More specifically, a region of the right side display portion 30R excluding the right display screen 32R is disposed further to the vehicle front side than the right display screen 32R, and a step portion 60R is formed between that region and the right display screen 32R. Similarly, a region of the left side display portion 30L excluding the left display screen 32L is disposed further to the vehicle front side than the left display screen 32L, and a step portion 60L is formed between that region and the left display screen 32L.

The right operation switch 34R and left operation switch 34L are narrower at base end sides than at distal end sides due to the step portion 60R and step portion 60L, but this is not limiting. That is, the step portions may be provided not only at the upper edge of the main body portion 30 and each distal end side and base end side may be formed with the same width, in which case the widths of the right operation switch 34R and left operation switch 34L may be the same at the distal end sides and base end sides.

In the present variant example, contact of the hands of the vehicle occupant gripping the steering wheel 12 with the main body portion 30 may be suppressed. Further, because the step portions 60R and 60L are formed between the right side display portion 30R and left side display portion 30L and the recessed region, stiffness of the main body portion 30 may be improved.

Second Variant Example

Figure 7:
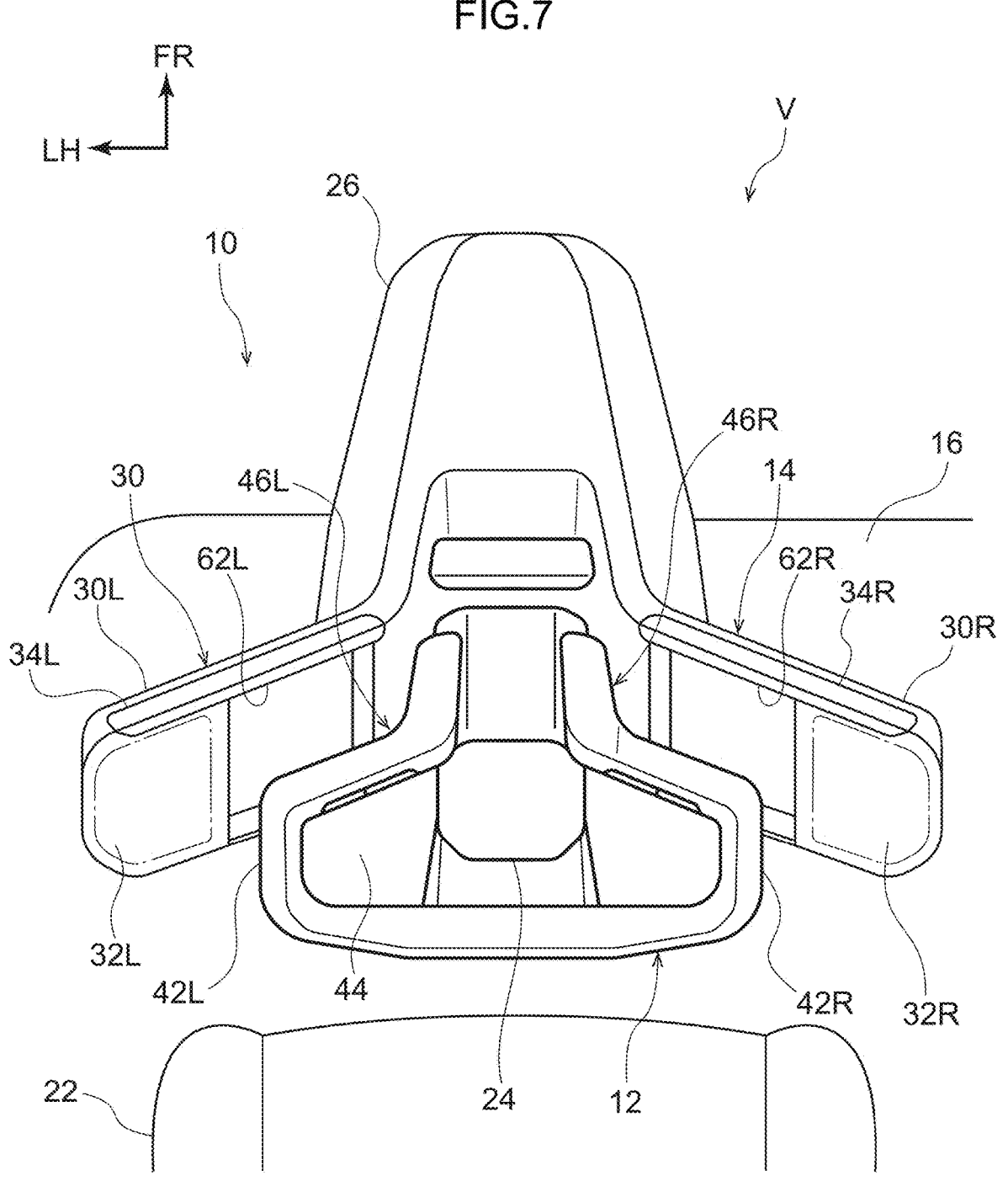
FIG. 7 is a view in which a steering module according to a second variant example is seen from the vehicle rear side.

FIG. 7 is a view in which a steering module according to the second variant example is seen from the vehicle rear side. As shown in FIG. 7, in the present variant example, a region of the main body portion 30 between the right side display portion 30R and the left side display portion 30L is cut out.

More specifically, a region of the right side display portion 30R excluding the right display screen 32R is formed in a cut-out shape, and a pass-through portion 62R is formed penetrating in the thickness direction of the right side display portion 30R. Similarly, a region of the left side display portion 30L excluding the left display screen 32L is formed in a cut-out shape, and a pass-through portion 62L is formed penetrating in the thickness direction of the left side display portion 30L.

In the present variant example, contact of the hands of the vehicle occupant gripping the steering wheel 12 with the main body portion 30 may be suppressed. Further, because portions of the main body portion 30 are formed in indented shapes, the main body portion 30 may be reduced in weight. The vehicle occupant may view the vehicle front side of the display device 14 through the pass-through portions 62R and 62L. Note that the region of the right side display portion 30R excluding the right display screen 32R and the region of the left side display portion 30L excluding the left display screen 32L may simply be narrowed in the thickness directions relative to the right display screen 32R and left display screen 32L without being cut out.

In the exemplary embodiment and variant examples described above, two of the right steering wheel switches 52R are provided at the upper right perimeter portion 46R and two of the left steering wheel switches 52L are provided at the upper left perimeter portion 46L, but this is not limiting. For example, steering wheel switches may be provided at only one of the upper right perimeter portion 46R and the upper left perimeter portion 46L. Structures are also applicable in which no steering wheel switches are provided.

The following additional notes are disclosed in relation to the exemplary embodiment described above.

Additional Note 1

The display device for a vehicle includes:
a main body portion disposed between a steering wheel and an instrument panel, a driver gripping the steering wheel and steering, the main body portion extending further to both left and right sides than the steering wheel, and a surface of the main body portion that opposes the driver being a display screen; and

an operation switch in a long, narrow shape that is provided at an upper edge of the main body portion, a length direction of the operation switch being in a vehicle width direction.

Additional Note 2

In the display device for a vehicle according to additional note 1, the main body portion includes: a right side display portion in a plate shape that is disposed to the vehicle front of a right side region of the steering wheel and, in plan view, is angled to the vehicle rear side toward the vehicle right side; and a left side display portion in a plate shape that is disposed to the vehicle front of a left side region of the steering wheel and, in plan view, is angled to the vehicle rear side toward the vehicle left side,
and the operation switch is provided respectively at an upper edge of the right side display portion and an upper edge of the left side display portion.

Additional Note 3

In the display device for a vehicle according to additional note 2, the display screen at each of the right side display portion and the left side display portion is provided with a touch panel that a vehicle occupant may operate by touching.

Additional Note 4

In the display device for a vehicle according to additional note 3, the touch panels are provided only in regions that extend at the left and right sides relative to the steering wheel.

Additional Note 5

In the display device for a vehicle according to additional note 3, the touch panels are provided at the whole of the display screens,
operation items with relatively high frequencies of operation are displayed at a region of the right side display portion that is at the right side relative to the steering wheel and a region of the left side display portion that is at the left side relative to the steering wheel, and
operation items with relatively low frequencies of operation are displayed at a region of the right side display portion that is at the left side relative to the steering wheel and a region of the left side display portion that is at the right side relative to the steering wheel.

Additional Note 6

In the display device for a vehicle according to any one of additional notes 3 to 5, a finger rest portion is provided at a face of each of the right side display portion and the left side display portion that is at the opposite side thereof from the side at which the display screen is provided.

Additional Note 7

In the display device for a vehicle according to any one of additional notes 2 to 6, a vehicle width direction central portion of a lower end portion of the main body portion is disposed further upward than both of vehicle width direction end portions of the lower end portion.

Additional Note 8

In the display device for a vehicle according to additional note 7, the vehicle width direction central portion of the lower end portion of the main body portion is disposed further upward than a lower end of the steering wheel as seen from the vehicle rear side.

Additional Note 9

In the display device for a vehicle according to any one of additional notes 2 to 8, a region between the right side display portion and the left side display portion is recessed to the vehicle front side relative to the right side display portion and the left side display portion.

Additional Note 10

In the display device for a vehicle according to any one of additional notes 2 to 9, a region of the main body portion between the right side display portion and the left side display portion is cut out.

Additional Note 11

In the display device for a vehicle according to any one of additional notes 1 to 10, the main body portion is structured to enable adjustment of a position thereof in a vertical direction independently of the steering wheel.

What is claimed is:

1. A display device for a vehicle, comprising:
a main body portion disposed between a steering wheel and an instrument panel, the main body portion extending further to both left and right sides than the steering wheel, and a surface of the main body portion that is disposed opposite a driver who is gripping the steering wheel to steer being a display screen; and
an operation switch in a long, narrow shape that is provided at an upper face of the main body portion, a length direction of the operation switch being in a vehicle width direction,
wherein the main body portion is structured to enable adjustment of a position thereof in a vertical direction independently of the steering wheel.

2. The display device for a vehicle according to claim 1, wherein:
the main body portion includes:
a right side display portion in a plate shape that is disposed to a vehicle front of a right side region of the steering wheel and, in plan view, is angled toward a vehicle rear side on progression toward the vehicle right side, and
a left side display portion in a plate shape that is disposed to the vehicle front of a left side region of the steering wheel and, in plan view, is angled toward the vehicle rear side on progression toward the vehicle left side; and
the operation switch is provided respectively at an upper face of the right side display portion and an upper face of the left side display portion.

3. The display device for a vehicle according to claim 2, wherein a step portion is formed between a region of the right side display portion excluding the display screen and the display screen, the region of the right side display portion excluding the display screen being disposed further to the vehicle front than the display screen.

4. The display device for a vehicle according to claim 3, wherein the operation switch extends from one side of the step portion to an opposite side of the step portion.

5. The display device for a vehicle according to claim 2, wherein the display screen at each of the right side display portion and the left side display portion is provided with a touch panel that a vehicle occupant may operate by touching.

6. The display device for a vehicle according to claim 5, wherein the touch panels are provided only in regions that extend at the left and right sides relative to the steering wheel.

7. The display device for a vehicle according to claim 5, wherein:
the touch panels are provided at the whole of the display screens,
operation items with relatively high frequencies of operation are displayed at a region of the right side display portion that is at the right side relative to the steering wheel and a region of the left side display portion that is at the left side relative to the steering wheel, and
operation items with relatively low frequencies of operation are displayed at a region of the right side display portion that is at the left side relative to the steering wheel and a region of the left side display portion that is at the right side relative to the steering wheel.

8. The display device for a vehicle according to claim 5, wherein a finger rest portion is provided at a face of each of the right side display portion and the left side display portion that is at an opposite side thereof from a side at which the display screen is provided.

9. The display device for a vehicle according to claim 2, wherein a region between the right side display portion and the left side display portion is recessed toward a vehicle front side relative to the right side display portion and the left side display portion.

10. The display device for a vehicle according to claim 2, wherein a region of the main body portion between the right side display portion and the left side display portion is cut out.

11. The display device for a vehicle according to claim 2, wherein a first pass-through portion is formed penetrating in a thickness direction of the right side display portion and a second pass-through portion is formed penetrating in a thickness direction of the left side display portion.

12. The display device for a vehicle according to claim 11, wherein the operation switch extends along respectively the first pass-through portion and the second pass-through portion.

13. The display device for a vehicle according to claim 1, wherein a vehicle width direction central portion of a lower end portion of the main body portion is disposed further upward than both of vehicle width direction end portions of the lower end portion.

14. The display device for a vehicle according to claim 13, wherein the vehicle width direction central portion of the lower end portion of the main body portion is disposed further upward than a lower end of the steering wheel as seen from the vehicle rear side.

15. A display device for a vehicle, comprising:
a main body portion disposed between a steering wheel and an instrument panel, the main body portion extending further to both left and right sides than the steering wheel, and a surface of the main body portion that is disposed opposite a driver who is gripping the steering wheel to steer being a display screen; and an operation switch in a long, narrow shape that is provided at an upper edge of the main body portion, a length direction of the operation switch being in a vehicle width direction, wherein the main body portion is structured to enable adjustment of a position thereof in a vertical direction independently of the steering wheel.

16. A display device for a vehicle, comprising:

a main body portion disposed between a steering wheel and an instrument panel, the main body portion extending further to both left and right sides than the steering wheel, and a surface of the main body portion that is disposed opposite a driver who is gripping the steering wheel to steer being a display screen; and an operation switch in a long, narrow shape that is provided at an upper face of the main body portion, a length direction of the operation switch being in a vehicle width direction, wherein:

the main body portion includes:

a right side display portion in a plate shape that is disposed to a vehicle front of a right side region of the steering wheel and, in plan view, is angled toward a vehicle rear side on progression toward the vehicle right side, and a left side display portion in a plate shape that is disposed to the vehicle front of a left side region of the steering wheel and, in plan view, is angled toward the vehicle rear side on progression toward the vehicle left side;

wherein the operation switch is provided respectively at an upper face of the right side display portion and an upper face of the left side display portion, and wherein a step portion is formed between a region of the right side display portion excluding the display screen and the display screen, the region of the right side display portion excluding the display screen being disposed further to the vehicle front than the display screen.

17. The display device for a vehicle according to claim 16, wherein the operation switch extends from one side of the step portion to an opposite side of the step portion.

18. A display device for a vehicle, comprising:

a main body portion disposed between a steering wheel and an instrument panel, the main body portion extending further to both left and right sides than the steering wheel, and a surface of the main body portion that is disposed opposite a driver who is gripping the steering wheel to steer being a display screen; and an operation switch in a long, narrow shape that is provided at an upper face of the main body portion, a length direction of the operation switch being in a vehicle width direction, wherein the main body portion includes:

a right side display portion in a plate shape that is disposed to a vehicle front of a right side region of the steering wheel and, in plan view, is angled toward a vehicle rear side on progression toward the vehicle right side, and a left side display portion in a plate shape that is disposed to the vehicle front of a left side region of the steering wheel and, in plan view, is angled toward the vehicle rear side on progression toward the vehicle left side;

wherein the operation switch is provided respectively at an upper face of the right side display portion and an upper face of the left side display portion, and wherein a first pass-through portion is formed penetrating in a thickness direction of the right side display portion and a second pass-through portion is formed penetrating in a thickness direction of the left side display portion.

19. The display device for a vehicle according to claim 18, wherein the operation switch extends along respectively the first pass-through portion and the second pass-through portion.

* * * * *